(12) United States Patent
DeCato

(10) Patent No.: US 6,645,339 B1
(45) Date of Patent: Nov. 11, 2003

(54) FLUID RESISTANT SILICONE COMPOSITIONS FOR SEALING MAGNESIUM ALLOY COMPONENTS

(75) Inventor: Alfred A. DeCato, Novara (IT)

(73) Assignee: Henkel Loctite Corporation, Rocky Hill, CT (US)

( * ) Notice: Subject to any disclaimer, the term of this patent is extended or adjusted under 35 U.S.C. 154(b) by 39 days.

(21) Appl. No.: 10/111,595

(22) PCT Filed: Nov. 15, 2000

(86) PCT No.: PCT/US00/31398

§ 371 (c)(1),
(2), (4) Date: Apr. 26, 2002

(87) PCT Pub. No.: WO01/36537

PCT Pub. Date: May 25, 2001

Related U.S. Application Data

(60) Provisional application No. 60/166,011, filed on Nov. 17, 1999.

(51) Int. Cl.$^7$ ............................................... C09J 103/04
(52) U.S. Cl. ...................... 156/329; 427/387; 427/515; 428/447; 428/448; 428/450; 524/425; 524/430; 524/433; 524/588; 528/34; 528/38
(58) Field of Search ........................ 156/329; 528/34, 528/38; 524/588, 425, 430, 433; 427/387, 515; 428/447, 448, 450

(56) References Cited

U.S. PATENT DOCUMENTS

| | | | | |
|---|---|---|---|---|
| 4,535,109 A | * | 8/1985 | Kondo et al. ................ | 524/188 |
| 4,673,750 A | | 6/1987 | Beers et al. ................. | 549/215 |
| 4,735,979 A | | 4/1988 | Beers et al. ................. | 524/188 |
| 4,847,396 A | | 7/1989 | Beers et al. ................. | 556/421 |
| 4,973,623 A | * | 11/1990 | Haugsby et al. ............ | 524/863 |
| 5,064,876 A | * | 11/1991 | Hamada et al. ............. | 522/99 |
| 5,212,211 A | | 5/1993 | Welch, II et al. ............ | 522/37 |
| 5,300,608 A | | 4/1994 | Chu et al. ................... | 556/14 |
| 5,346,940 A | | 9/1994 | Brassard et al. ............. | 524/267 |
| 5,434,214 A | | 7/1995 | Wolosen et al. ............. | 524/720 |
| 5,516,812 A | | 5/1996 | Chu et al. ................... | 522/20 |
| 5,527,932 A | * | 6/1996 | Kasuya ....................... | 556/423 |
| 5,569,750 A | | 10/1996 | Knepper et al. ............. | 524/731 |
| 5,733,995 A | | 3/1998 | Kimura et al. .............. | 528/15 |

FOREIGN PATENT DOCUMENTS

| | | | | |
|---|---|---|---|---|
| EP | 0 050 453 | | 4/1982 | ........... C08L/83/04 |
| EP | 0 539 234 | | 4/1993 | ........... C08L/83/06 |
| EP | 0 718 369 | | 6/1996 | ........... C08L/83/04 |
| EP | 0 572 149 | | 8/1998 | ........... H02P/6/00 |
| JP | 92143102 | | 1/1995 | ........... C08G/77/18 |
| JP | 2001139917 A | * | 5/2001 | ........... C09J/183/04 |
| JP | 2002309219 A | * | 10/2002 | ........... C09J/183/04 |
| WO | WO 93/19130 | | 9/1993 | ........... C08L/83/04 |
| WO | WO 95/32245 | | 11/1995 | ........... C08L/83/04 |

* cited by examiner

Primary Examiner—Robert Dawson
Assistant Examiner—Marc S. Zimmer
(74) Attorney, Agent, or Firm—Steven C. Bauman

(57) ABSTRACT

Silicone compositions are disclosed which exhibit excellent adherence to magnesium-based substrates such as magnesium alloys and which exhibit excellent resistance to organic solvents. These compositions include at least one polymerizable silicone component, at least one amino-containing silane adhesion promoter which enhances adhesion of the composition to magnesium-based substrates, and at least one viscosity modifier, which enhances the resistance of the compositions to organic solvents. Methods of making these compositions, articles of manufacture including these compositions, and a method for providing enhanced adhesion to magnesium-based substrates using these compositions are also disclosed.

11 Claims, No Drawings

FLUID RESISTANT SILICONE COMPOSITIONS FOR SEALING MAGNESIUM ALLOY COMPONENTS

This application claims benefit of provisional application No. 60/166,011, filed Nov. 17 1999.

FIELD OF THE INVENTION

The present invention relates generally to compositions for sealing and adhering magnesium-based substrates. More particularly, the present invention relates to compositions which demonstrate excellent resistance to fluid solvents, particularly automotive fluids, while maintaining excellent adherence to magnesium-based substrates.

BACKGROUND OF RELATED TECHNOLOGY

Room temperature vulcanizable (RTV) silicones posses an interesting combination of properties that make them very desirable for a large number of applications. These properties include a viscosity range that allows for use as flowable liquids or soft pastes, excellent thermal stability characteristics of high-consistency silicone rubber, good adhesion to many surfaces without requiring pressure, and curing without the need for heating, as their name implies. However, RTV silicones have not been used for sealing and bonding magnesium-based substrates, such as magnesium alloy substrates.

It is known to add viscosity-modifying filler materials to RTV silicones to improve their resistance to fluid solvents. For example, the addition of certain grades of metal oxides to silicone elastomers is known to result in silicone rubber compositions having a certain degree of oil resistance. European Patent Publication No. 572 148, assigned to General Electric Company, discloses the incorporation of mixed metal oxides into heat cured silicone elastomeric compositions containing MQ resins (M=$R_3SiO_{1/2}$ mono-functional groups; Q=$SiO_2$ quadri- functional groups). In the '148 publication, such compositions are formed into engine gaskets which are reported to display a certain degree of oil resistance.

It is further known to add silane compounds to silicone elastomers to improve the adhesive properties of RTV silicone compositions. For example, U.S. Pat. No. 5,569,750 to Knepper et al. discloses a silicone rubber composition including an aminohydrocarbyl-substituted ketoximinosi-lane which reportedly possesses improved adhesive properties.

Silicone elastomers are commonly used as adhesives and sealants in automotive applications. For instance, U.S. Pat. Nos. 4,847,396 and 4,735,979, both assigned to Loctite Corporation, disclose RTV silicone compositions as automotive sealants. These patents disclose the use of adhesion promoters in silicone compositions to improve the adhesive strength of the silicone compositions to ferrous and aluminum substrates, even when these substrates have motor oil coated on their surfaces. Further, U.S. Pat. No. 5,434,214, also assigned to Loctite Corporation, discloses hydrosilation cured silicone formulations which cure at room temperature and, after a subsequent heat cure cycle, provide good primerless adhesion to aluminum and titanium substrates.

Magnesium alloys, typically alloys which include magnesium, aluminum and, to a lesser degree, zinc and manganese, have traditionally been used in aeronautic applications. They are characterized as being light in weight, offering high strength, being easily molded, having the ability to withstand high tolerances, and having the ability to withstand high temperatures. As a result of these properties, magnesium alloys are finding increased utility in other areas, such as automotive applications.

Magnesium alloys have traditionally been joined by riveting or welding. It is desirable, however, to bond and seal magnesium alloys using adhesives, as adhesive bonding and sealing offers advantages in weight saving, fatigue strength, and corrosion resistance. Attempts at such bonding and sealing, however, have proven generally commercially unacceptable for many applications, particularly automotive applications where the adhesives are exposed to automotive fluids, such as engine oils and coolants, at temperatures observed during operation of an automobile engine. These fluids tend to degrade the adhesives, thereby destroying their ability to seal and bond the substrates. Further, oxidation on the surface of magnesium alloys results in the formation of a layer of magnesium oxide which prevents bonding of adhesive materials to the underlying magnesium alloy.

Therefore, there exists a need for an elastomeric composition which exhibits improved adherence to magnesium-based substrates such as magnesium alloys, maintains structural integrity upon exposure to fluid solvents, and exhibits flexibility when subjected to thermal and mechanical stresses. The current invention is directed towards meeting these and other needs.

SUMMARY OF THE INVENTION

The present invention is directed to compositions which are suitable for use as sealants and adhesives on magnesium-based substrates such as magnesium alloy substrates. Particularly, the present invention is directed to a silicone composition, the reaction products of which demonstrate improved adhesion to magnesium-based substrates, which includes at least one polymerizable silicone component, at least one amino-containing silane adhesion promoter, and at least one filler. These compositions demonstrate excellent resistance to fluids, such as automotive fluids, while maintaining their enhanced adherence to magnesium-based substrates. Additionally, these compositions maintain their structural integrity when subjected to thermal and mechanical stresses. Desirably, the compositions include one or more polymerizable silicone polymers, such as RTV silicones, at least one amino-containing silane compound which serves as a magnesium alloy adhesion promoter, and at least one filler which serves to provide fluid resistance to the compositions. The present compositions can be used to seal interfaces between magnesium-based substrates, bond magnesium-based substrates together, and bond magnesium-based substrates to non-magnesium-based substrates. The present invention is also directed to a method for providing enhanced adhesion to magnesium-based substrates by disposing a composition of the present invention between two substrates and then curing the composition. Additionally, the present invention is directed to an article of manufacture including a composition of the present invention.

Compositions of the present invention can be dispensed on magnesium-based substrates in a liquid phase and allowed to cure at room temperature or can be cured prior to application to form automotive sealant devices, such as gaskets and o-rings. Methods of making these compositions and their use are also disclosed.

DETAILED DESCRIPTION OF THE INVENTION

The present invention is directed to compositions which are curable to an elastomeric state and which exhibit improved adherence to magnesium-based substrates such as magnesium alloys and enhanced resistance to fluids, such as those commonly used in and around automotive engines. Compositions of the present invention include polymerizable silicone compounds, such as reactive polysiloxanes, at least one amino-containing silane compounds, and at least one filler.

Any conventional polysiloxane may be used in compositions of the present invention and may be present in any amount, provided the resulting compositions effectively bond to magnesium-based substrates, form effective seals when cured, and are rendered substantially insoluble or resistant to automotive fluid solvents. For example, room temperature curing, actinic radiation curing, heat curing or silicones which cure by more than one of these mechanisms may be used. Desirably, the polysiloxane is an RTV compound. RTV compounds are typically low-consistency silicone elastomers that can be easily extruded from a tube or other dispenser and subsequently cured. Silicones which cure at room temperature may exist in one-part systems or in two-part systems.

In a one-part system, the silicones are typically organosiloxane compounds which may include hydrolyzable groups on their ends. They are stored in a noncrosslinked state in a moisture-impermeable container until they are to be used. When they are removed from the container and exposed to moisture, the hydrolyzable groups react with the moisture in a condensation reaction, resulting in crosslinking of the polymer. An example of an RTV organopolysiloxane is a hydroxy-terminated diorganopolysiloxane represented by the formula:

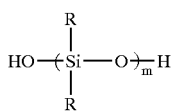

(I)

wherein m is from about 50 to about 2000, desirably from about 500 to about 800, R is independently an unsubstituted or substituted monovalent hydrocarbon group exemplified by alkyl groups, such as methyl, ethyl, propyl and butyl groups; cycloalkyl groups, such as a cyclohexyl group; alkenyl groups, such as vinyl and allyl groups; and aryl groups, such as phenyl and tolyl groups; as well as those substituted groups obtained by replacing a part or all of the hydrogen atoms in the above-referenced hydrocarbon groups with halogen atoms, cyano groups and the like.

Desirably, the polysiloxane used in the present invention is a hydroxy-terminated poly(dimethylsiloxane). This polysiloxane may also be a single hydroxy-terminated poly(dimethylsiloxane) or may be a combination of hydroxy-terminated poly(dimethylsiloxanes) which are of different viscosities. For example, they may have viscosities of from 2000 cps to 10,000 cps, correlating to a molecular weight range of approximately 36,000 to 60,000. Such hydroxy-terminated poly(dimethylsiloxane) compounds are available commercially from Union Carbide, identified by proprietary designations Y-7839 and Y-7869, and from Mobay, identified by proprietary designation Baylisone E-2.

RTV silicone compositions have long been used in automotive and other applications and many variations thereof are known. By way of example, RTV silicones have been formulated as automotive engine cured-after-assembly gasketing materials where high temperature aggressive fluids, such as engine coolant and motor oil, create a particularly hostile environment. Examples of silicones formulated for such automotive gasketing applications are described in U.S. Pat. Nos. 4,673,750 (Beers et al.), 4,735,979 (Beers et al.), 4,847,396 (Beers et al.), and 5,346,940 (Brassard et al.), all expressly incorporated by reference herein.

Useful heat curable siloxanes that may be used in the present invention include, but are not limited to, linear polyorganosiloxanes, monomeric siloxanes, polydimethylsiloxane chains having SiH functionality located at either the ends or the middle of the chains, cyclic siloxanes and combinations thereof. Particularly useful heat curable silicones include polysiloxanes in combination with vinyl-terminated low molecular weight polysiloxanes. More particularly, dimethyl vinyl-terminated polydimethylsiloxane (10,000 MW vinyl fluid) and vinyl-terminated polydimethylsiloxane (62,000 MW vinyl fluid) may be used as a heat curable polymer in the present invention.

Heat curable polyorganosiloxanes having olefinic unsaturation should contain at least one reactive functional group, and desirably two reactive functional groups. More than two reactive functional groups are also contemplated. The number and type of functional group or groups present can be varied according to the desired properties of the final silicone composition. The organic groups of the polyorganosiloxane are monovalent hydrocarbon radicals and preferably the organo groups are selected from alkyl radicals, such as methyl, ethyl, propyl, etc.; alkenyl radicals such as vinyl, allyl, etc.; cycloalkyl radicals such as cyclohexyl, cycloheptyl, and; mononuclear aryl radicals such as phenyl, ethylphenyl; and haloalkyl such as 3, 3, 3-trifluoropropyl.

Heat curable polyorganosiloxanes useful in the present invention are represented by the following general formula:

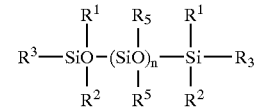

wherein n is an integer such that the viscosity is from about 25 cps to about 2,500,000 cps at 25° C., such as when n is from 1 to 1,200 and desirably from 10 to 1,000; $R^1$, $R^2$, $R^3$ and $R^5$ can be the same or different and are substituted or unsubstituted hydrocarbon or hydrocarbonoxy radicals from $C_{1-20}$, provided that at least one of these R groups, and desirably more than one, are selected from the reactive functional groups consisting of (meth)acrylate, carboxylate, maleate, cinnamate and combinations thereof, and provided that the reactive functional group is not directly bonded to a silicon atom, but separated from the silicon atom by an intervening chemical moiety, such as an atom or chemical group. For example, when one or more of the aforementioned R groups ($R^1$, $R^2$, $R^3$ and $R^5$) is not one of the required reactive functional groups, they can be chosen from alkyl radicals such as methyl, ethyl, propyl, butyl and pentyl; alkenyl radicals such as vinyl and allyl; cycloalkyl radicals such as cyclohexyl and cycloheptyl; aryl radicals such as phenyl, methylphenyl, ethylphenyl; arylalkyl radicals such as beta-phenylethyl; alkylaryl radicals; and hydrocarbonoxy radicals such as alkoxy, aryloxy, alkaryloxy, aryalkoxy, and desirably methoxy, ethoxy or hydroxy, and the like. Any of the foregoing radicals may have some or all of the hydrogen atoms replaced, for example, by a halogen such as fluorine or chlorine. One or more of the aforementioned R groups can also be hydrogen, provided the required reactive functional group is present as indicated and the presence of the hydrogen does not deleteriously interfere with the ability of the polyorganosiloxane to perform in the present invention. $R^3$ in the above formula desirably is a vinyl group or a dimethyl vinyl group.

Radiation curable silicones, particularly those curable by ultraviolet light (UV) and electron beam (EB), may also be used in the present invention. Organopolysiloxane polymers are rendered radiation hardenable by functionalizing them with radiation susceptible groups. The three most common groups used to convert silicones as radiation curable are mercapto-olefins, epoxies, and acrylics. For instance, acrylics and mercapto-olefins crosslink by free radicals and, therefore, can be crosslinked in the presence of suitable photoinitiators. One example of a UV curable silicone composition useful in the present invention is described in U.S. Pat. No. 5,300,608 (Chu), the disclosure of which is expressly incorporated herein by reference. The photocurable silicone composition is described therein to include alkoxy-terminated organopolysiloxanes represented by the formula:

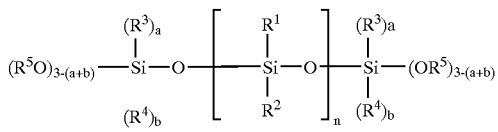

wherein $R^1$, $R^2$, $R^3$ and $R^4$ may be identical or different and are monovalent hydrocarbon radicals having up to 10 carbon atoms ($C_{1-10}$), or halo or cyano substituted hydrocarbon radicals; $R^3$ may also be a monovalent heterohydrocarbon radical having up to 10 carbon atoms ($C_{1-10}$), wherein the heteroatoms are selected from the group consisting of haloatoms, O, N; $R^5$ is alkyl ($C_1$–$C_{10}$), preferably methyl, ethyl or isopropyl; $R^5$ may also be a $CH_2CH_2OCH_3$; n is an integer; a is 0, 1 or 2; b is 0, 1 or 2; and a+b is 0, 1 or 2. In a particularly desirable embodiment, $R^3$ is a methacryloxypropyl group, $R^4$ and $R^5$ are methyl groups, and $R^1$ and $R^2$ are methyl groups. The alkoxy-terminated organopolysiloxanes can be prepared as described in the '608 patent.

It is also known to cure polymerizable silicone compounds by more than one curing method. For example, U.S. Pat. No. 5,212,211 (Welch II et al.), expressly incorporated by reference herein, discloses a silicone compound which is curable by more than one method of curing, such as heat curing, moisture curing, or curing with ultraviolet light. U.S. Pat. No. 5,516,812 (Chu et al.), expressly incorporated by reference herein, discloses a silicone composition which is both UV and moisture cured. Additionally, European Patent 539 234 discloses a composition for liquid gasketing which has both an UV curing property and a moisture-curing property and Japanese Patent Application No. 92143102 to Tokyo Three Bond Co., Ltd. discloses compositions which are both moisture curable and UV curable.

While specific examples of siloxane polymers which may be used in the present invention have been illustrated, these examples are in no way meant to be limiting. It will be apparent to those skilled in the art that numerous silicone polymers are suitable for use in compositions of the present invention, including those which are curable by more than one means.

Compositions of the present invention also include one or more amino-containing silane compounds which act as adhesion promoters. These amino-containing silane compounds are present in amounts of about 0.1 percent by weight of the composition to about 5.0 percent by weight of the composition. Desirably, these compounds are present in amounts of about 0.74 percent by weight of the composition to about 1.4 percent by weight of the composition. Amino-containing silane compounds which are useful in the present invention include, but are not limited to, silane compounds containing amino-alkyl groups, such as gamma-ureidopropyltrimethoxy silane, 3-aminopropyl trimethoxysilane, N,N'-bis(3-trimethoxysilylpropyl)urea, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, tertiary alkyl carbamate silane, and aminoethyl-3-aminopropyl-methyl-dimethylsilane. Other desirable amino-containing silane compounds include silane compounds containing amino-cycloaliphatic groups such as methyl tris(cyclohexylamino)silane and silane compounds containing amino-aromatic groups such as methyl tris-(N-methylbenzamido)silane.

In addition to at least one or more amino-containing silane compound, one or more additional silane compounds may be present in the composition of the present invention. Generally, these additional silane compounds serve as crosslinking agents. Examples of these additional silane compounds include, but are not limited to, methyltrimethoxysilane, vinyltrimethoxysilane, methyltriethoxysilane, vinyltriethoxysilane, methyltriacetoxysilane, vinyltriethoxysilane, methyltriacetoxysilane, methyl tris-(isopropenoxy)silane, enoxysilane, tetra (methyl ethyl ketoximino) silane/vinyl tris(methyl ethyl ketoximino) silane 1:1, vinyl tris(methyl ethyl ketoximino) silane, glycidoxypropyl trimethoxysilane, 3-glycidoxypropyltrimethoxy silane, gamma-mercaptopropyltrimethoxysilane, gamma-methacryloxypropyltrimethoxysilane, methyl tris-(methyl ethyl ketoximino)silane, vinyl tris-(methyl ethyl ketoximino)silane, methyl tris-(methyl isobutyl ketoximino) silane, vinyl tris-(methyl isobutyl ketoximino)silane, tetrakis-(methyl ethyl ketoximino)silane, tetrakis-(methyl isobutyl ketoximino) silane, tetrakis-(methyl amyl ketoximino)silane, dimethyl bis-(methyl ethyl ketoximino) silane, methyl vinyl bis-(methyl ethyl ketoximino)silane, methyl vinyl bis-(methyl isobutyl ketoximino)silane, methyl vinyl bis-(methyl amyl ketoximino)silane, tetrafunctional alkoxy-ketoxime silane, and tetrafunctional alkoxy-ketoximino silane. For example, tetra (methyl ethyl ketoximino) silane/vinyl tris(methyl ethyl ketoximino) silane 1:1 is desirably used in the present invention. Tetra (methyl ethyl ketoximino silane is represented by the following general formula:

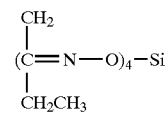

Vinyl tris(methyl ethyl ketoximino) silane is represented by the following formula:

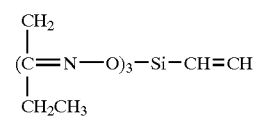

It will be apparent to one skilled in the art that any combination of one or more amino-containing silane compounds and one or more additional silane compounds be present in the composition of the present invention so long as the composition exhibits the desired magnesium alloy adherence properties of the present invention.

The fillers used in the present invention provide fluid solvent resistance to reaction products of the composition, i.e., the cured composition. In the present invention, this is particularly important where the composition is used as a sealant or bonding agent for cast magnesium alloy substrates in automotive applications. Such substrates typically are in contact with automotive fluids, such as engine oils, transmission fluids, and coolants. The compositions of the present are not degraded by these fluids, making them desirable for such automotive uses.

Fillers which are used for imparting desired characteristics to elastomeric substances, and, consequently, which are suitable for use in the present invention, are known to those skilled in the art. They are added to compositions to impart desired properties to the composition. Such properties include heat stability, flame retardation, improved handling properties (e.g., elasticity), improved vulcanization properties, desired coloration, resistance to fungi, resistance to mildew, ability to absorb ultraviolet rays, and thermal and electrical conductivity. Such fillers include, without limitation, carbon black, aluminum flake (aluminum pigment powder in mineral oil), silane-treated fumed silica, precipitated silica, stearate coated calcium carbonate, calcium carbonate, iron aluminum silicate, magnesium oxide, talc, ground quartz, clay, titanium dioxide, iron oxide, and various other metal oxides such as cerium, zinc, and barium oxides.

Having set forth examples of suitable compounds which may be present in compositions of the present invention, specific examples of compositions which were formulated and tested will now be set forth in detail below.

Base Composition A.

| Compound | % (w/w) |
|---|---|
| Hydroxy-terminated poly(dimethylsiloxane) mixture[1] | 50.95 |
| Carbon black | 0.25 |
| Hydrophobic fumed silica | 2.00 |
| Stearate coated calcium carbonate | 10.00 |
| Calcium carbonate | 25.00 |
| Magnesium oxide | 5.00 |
| Tetra (methyl ethyl ketoximino) silane/ vinyl tris (methyl ethyl ketoximino) silane 1:1 | 1.5 |
| Vinyl tris (methyl ethyl ketoximino) silane | 5.00 |
| Hexafunctional silyl ethane | 0.30 |
|  | 100.00 |

[1]Combination of 12.00% w/w 2000 cps Hydroxy-terminated polydimethyl siloxanes and 38.95% w/w 6000 cps Hydroxy-terminated polydimethyl siloxanes.

A mixture of hydroxy-terminated polydimethyl siloxanes (12% w/w 2000 cps and 38.95% w/w 6000 cps), carbon black, hydrophobic fumed silica, stearate coated calcium carbonate, calcium carbonate, and magnesium oxide were combined and mixed at medium speed while heating to 210–220° F. The mixture was then mixed at high speed under a vacuum for 90 minutes and cooled to 180+/−5° F. Once this temperature was reached, the mixture was removed from the vacuum. The tetra (methyl ethyl ketoximino) silane/vinyl tris(methyl ethyl ketoximino) silane 1:1 and a first sample of the vinyl tris(methyl ethyl ketoximino) silane was then added to the mixture. This mixture was then mixed at medium speed for 15 minutes in a nitrogen environment. After 15 minutes, a second sample of the vinyl tris(methyl ethyl ketoximino) silane was added to the mixture. The mixture was then allowed to cool. The mixture was then mixed under a vacuum until the temperature of the mixture was below 110° F. The vacuum and nitrogen were then removed and the hexafunctional silyl ethane was then added to the mixture. The mixture was mixed for 15 minutes under a vacuum and allowed to cool. The composition was extruded at 90 psi at a rate of 300 g/min. The resulting composition had the following physical properties: Hardness Shore A=48; Tensile Strength (psi)= 252 psi; 100% Modulus (psi)=191; % Elongation=179.

Base Composition B.

| Compound | % (w/w) |
|---|---|
| Hydroxy-terminated poly(dimethylsiloxane) mixture[1] | 50.00 |
| Carbon black | 0.20 |
| Hydrophobic fumed silica | 3.00 |
| Stearate coated calcium carbonate | 10.00 |
| Calcium carbonate | 25.00 |
| Magnesium oxide | 5.00 |
| Tetra (methyl ethyl ketoximino) silane/ vinyl tris (methyl ethyl ketoximino) silane 1:1 | 1.5 |
| Vinyl tris (methyl ethyl ketoximino) silane | 5.00 |
| Hexafunctional silyl ethane | 0.30 |
|  | 100.00 |

[1]Combination of 11.00% w/w 2000 cps hydroxy-terminated polydimethyl siloxanes and 39.005% w/w 6000 cps hydroxy-terminated polydimethyl siloxanes.

Various silane compounds were mixed with 100 g of Base Composition A to produce the Inventive Compositions 1–7 shown in Table 1.

TABLE 1

Inventive Compositions 1–7.

| Composition | Silane Added to Base Composition A | Amount (g) | % Silane (w/w) |
|---|---|---|---|
| 1 | Glycidoxpropyl trimethoxysilane | 1.50 | 1.40 |
| 2 | 3-aminopropyl trimethoxysilane | 1.50 | 1.40 |
| 3 | N,N'-bis(3-trimethoxy silylpropyl)urea | 1.50 | 1.40 |
| 4 | Tertiary alkyl carbamate silane | 1.50 | 1.40 |
| 5 | Vinyltriisopropoxy silane | 1.50 | 1.40 |
| 6 | 2-diphenylphosphinoethyltriethoxy- silane | 1.50 | 1.40 |
| 7 | Trimethoxysilylpropyldiethylene- triamine | 1.50 | 1.40 |

Additionally, various silane compounds were mixed with 100 g of Base Composition B to produce the Inventive Compositions 8–14 shown in Table 2.

TABLE 2

Inventive Compositions 8–14.

| Composition | Silane Added to Base Composition B | Amount (g) | % Silane (w/w) |
|---|---|---|---|
| 8 | Trimethoxysilylpropyldiethylene- triamine | 1.00 | 0.90 |
| 9 | Trimethoxysilylpropyldiethylene- triamine | 0.75 | 0.74 |
| 10 | Aminoethyl-3-aminopropyl-methyl- dimethylsilane | 1.50 | 1.40 |
| 11 | Tris-[3-(trimethoxysilyl)propyl] isocyanurate | 1.50 | 1.40 |
| 12 | Aminoethyl-3-aminopropyl-methyl- dimethoxylsilane | 1.00 | 0.99 |
| 13 | Aminoethyl-3-aminopropyl-methyl- dimethoxylsilane | 0.50 | 0.50 |
| 14 | Gamma-ureidopropyltrimethoxy silane and Aminoethyl-3-aminopropyl-methyl- dimethylsilane | 0.75 | 0.74 |

Composition 7 was chosen as a representative for measurement of the following physical properties: Hardness Shore A=46; Tensile Strength (psi)=307; 100% Modulus (psi)=254; % Elongation=134.

Lap shear specimens were prepared for Base Composition A, which served as a control, and for compositions 1–13 using magnesium and aluminum substrates. The magnesium and aluminum substrates were used in each lap shear test such that each specimen included a layer of magnesium alloy, the composition being tested, and a layer of aluminum. The specimens had ½ inch overlap and 0.040 inch gap. The prepared samples were cured for 7 days at room temperature and 50% relative humidity. The specimens were pulled at 0.5 inches/minute per American Standard Test Method (ASTM) DI1002. The results of these measurements are shown in Table 3.

TABLE 3

Lap Shear Measurement for Base Composition A and Compositions 1–13.

| Composition | Shear Strength (psi) | Type of Failure[1] |
|---|---|---|
| Base A | 64 | 100% AF @ Mg |
| 1 | 89 | 75% AF @ Mg |
| 2 | 123 | 33% CF @ Mg |
| 3 | 73 | 100% AF @ Mg |
| 4 | 75 | 100% AF @ Mg |
| 5 | 74 | 100% AF @ Mg |
| 6 | 61 | 66% AF @ Al |
| 7 | 153 | 30% CF @ Mg |
| 8 | 134 | 20% CF @ Mg |
| 9 | 98 | 10% CF @ Mg |
| 10 | 133 | 95% CF @ Mg |
| 11 | 94 | 100% AF @ Mg |
| 12 | 192 | 50–80% CF @ Mg |
| 13 | 93 | 100% AF @ Mg |

[1]AF = Adhesive Failure
CF = Cohesive Failure

As noted above, all but one of the inventive compositions exhibited a substantial increase in tensile shear strength, with more than half of them demonstrating cohesive failure, as opposed to adhesive failure. Cohesive failure, or failure within the adhesive as opposed to at the bondline interface, indicates that the adhesion to the magnesium substrate is stronger than the adhesive per se. Such failure is desirable in the present invention as it indicates enhanced adherence to the magnesium substrate. With Base Composition A, a relatively low application of stress is needed to effect complete adhesive failure. Modification of Base Compositions A and B with the addition of various amino-containing silanes, represented in Tables 1 and 2, necessitates the application of significantly greater stress to effectuate failure of the composition.

Certain lap shear specimens demonstrating excellent magnesium alloy adherence properties were subsequently subjected to individual immersion in an aqueous solution of 50% Honda® LC coolant and Honda® MTF gear oil and shear strengths were measured as above. The results of these tests are shown in Tables 4 and 5, respectively.

TABLE 4

Lap Shear Measurements for Compositions 7, 10, 12 and 13 Subsequent to Immersion in an Aqueous Solution of 50% Honda ® LC coolant for 150 hours at 105° C.

| Composition | Shear Strength (psi) | % Change[1] | Type of Failure |
|---|---|---|---|
| 7 | 45 | −71% | 95% AF |
| 10 | 48 | −64% | 85% AF |
| 12 | 30 | −84% | 98% AF |
| 13 | 119 | 28% | 80% AF |

[1]Change in shear strength from pre-immersion measurement (Table 3).

TABLE 5

Lap Shear Measurements for Compositions 7, 10, 12 and 13 Subsequent to Immersion in Honda ® MTF Gear Oil for 150 hours at 120° C.

| Composition | Shear Strength (psi) | % Change[1] | Type of Failure |
|---|---|---|---|
| 7 | 84 | −45% | 90% AF |
| 10 | 176 | 32% | 100% CF |
| 12 | 127 | −34% | 65% AF |
| 13 | 25 | −73% | 100% AF |

[1]Change in shear strength from pre-immersion measurement (Table 3).

As shown in Tables 4 and 5, the specimens were subjected to the extreme test of immersion in these respective fluids for 150 hours at 105° C. This test was an accelerated aging test designed to approximate the extended real life use. In each case, as expected, some tensile strength was lost, but sufficient useful bond strength remained and each specimen exhibited some cohesive failure. Shear strength measurements taken subsequent to immersion illustrate that the compositions maintained acceptable adhesion and cohesion despite extended fluid contact. Based on automotive industry specifications, these results suggests that the amino-silane containing compositions of the present invention are suitable sealing and bonding agents for magnesium alloy substrates when used in automotive applications.

Additional inventive compositions were made using the same procedure used to make the Base Compositions set forth previously. These inventive compositions are set forth below in Table 6 are labeled Compositions 15–30.

TABLE 6

Inventive Compositions 15–30[1].

| Composition | % Silicones[2] | % Fillers[3] | % Cross-linking Silanes[4] | % Adhesion Promoters[5] |
|---|---|---|---|---|
| 15 | 47.90 | 46.90 | 4.90 | 0.30 |
| 16 | 45.20 | 48.55 | 5.50 | 0.75 |
| 17 | 55.20 | 37.55 | 6.50 | 0.75 |
| 18 | 45.20 | 47.55 | 6.50 | 0.75 |
| 19 | 47.30 | 45.65 | 6.00 | 1.05 |
| 20 | 47.80 | 44.70 | 6.75 | 0.75 |
| 21 | 47.50 | 44.90 | 6.75 | 0.85 |
| 22 | 45.50 | 47.00 | 6.75 | 0.75 |
| 23 | 48.60 | 44.65 | 6.00 | 0.75 |
| 24 | 49.00 | 43.50 | 6.50 | 1.00 |
| 25 | 49.00 | 43.50 | 6.50 | 1.00 |
| 26 | 49.00 | 43.75 | 6.50 | 0.75 |
| 27 | 49.25 | 43.50 | 6.50 | 0.75 |
| 28 | 48.25 | 43.50 | 6.50 | 1.75 |
| 29 | 50.00 | 42.50 | 6.50 | 1.00 |
| 30 | 48.00 | 44.50 | 6.50 | 1.00 |

[1]Details of Compositions 15–30 are shown in Table 6a below.
[2]Selected from 2000 cps, 6000 cps, and 10,000 cps hydroxy-terminated polydimethylsiloxanes.
[3]Selected from Aluminum pigment powder in mineral oil, Silane-treated fumed silica, Stearate-coated calcium carbonate, Carbon black, Hydrophobic fumed silica, Magnesium oxide, Iron aluminum silicate, Silylated silica, Alkyl tin carboxylate, and Amorphous hydrophobic silica.
[4]Selected from tetra (methyl ethyl ketoximino) silane/vinyl tris (methyl ethyl ketoximino) silane 1:1 and vinyl tris (methyl ethyl ketoximino) silane.
[5]Selected from gamma-ureidopropyltrimethoxy silane, 3-aminopropyl trimethoxysilane, N,N'-bis (3-trimethoxy silylpropyl) urea, trimethoxysilyl-propyldiethylene triamine, and aminoethyl-3-aminopropyl-methyl dimethylsilane.

TABLE 6a

Details of Compositions 15–30.

| Component | 15 w/w % | 16 w/w % | 17 w/w % | 18 w/w % | 19 w/w % | 20 w/w % | 21 w/w % | 22 w/w % | 23 w/w % | 24 w/w % | 25 w/w % | 26 w/w % | 27 w/w % | 28 w/w % | 29 w/w % | 30 w/w % |
|---|---|---|---|---|---|---|---|---|---|---|---|---|---|---|---|---|
| 2000 cps Silanol[1] | | 12.0 | 17.0 | 12.0 | | | | 5.7 | 5.5 | | 11.0 | 11.0 | 11.0 | 11.25 | 10.25 | 11.0 | 11.0 |
| 6000 cps Silanol[2] | 39.4 | 32.2 | 38.2 | 33.2 | 47.3 | 47.8 | 41.8 | 40.0 | 48.6 | 38.0 | 38.0 | 38.0 | 38.0 | 38.0 | 39.0 | 37.0 |
| 10,000 cps Silanol[3] | 8.5 | | | | | | | | | | | | | | | |
| Carbon Black | | 0.25 | .25 | .25 | .25 | 0.7 | 0.7 | 0.7 | .25 | 0.2 | 0.2 | 0.2 | 0.2 | 0.2 | 0.2 | 0.2 |
| Aluminum Flake[4] | 0.9 | | | | | | | | | | | | | | | |
| Silane-treated Fumed Silica | 2.0 | | | | | | | | | | | | | | | |
| Silylated Silica | | | | | | 4.0 | 0.2 | 2.0 | | | | | | | | |
| Hydrophobic Fumed Silica | | 2.0 | 2.0 | 2.0 | | | | | 4.0 | 3.0 | 3.0 | | | | 4.0 | 4.0 |
| Hydrophobic Amorphous Silica | | | | | | | | | | | | 3.0 | 3.0 | 3.0 | | |
| Stearate-coated Calcium Carbonate | 44.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| Calcium Carbonate | | 15.0 | 15.0 | 25.0 | | | | | 25.0 | 25.0 | 25.0 | 25.0 | 25.0 | 25.0 | 25.0 | |
| Iron Aluminum Silicate | | | | | 30.0 | 30.0 | 30.0 | 30.0 | | | | | | | 3.0 | 30.0 |
| Magnesium Oxide | | 21.0 | 10.0 | 10.0 | 5.4 | | 4.0 | 4.0 | 5.0 | 5.0 | 5.0 | 5.0 | 5.0 | 5.0 | | |
| TOS/VOS[5] | 1.5 | 1.5 | 1.5 | 1.5 | 0.75 | 0.75 | 0.75 | 0.75 | 0.75 | 1.5 | 1.5 | 1.5 | 1.5 | 1.5 | 1.5 | 1.5 |
| VOS[6] | 3.4 | 5.0 | 5.0 | 5.0 | 5.25 | 6.0 | 6.0 | 6.0 | 5.25 | 5.0 | 5.0 | 5.0 | 5.0 | 5.0 | 5.0 | 5.0 |
| Uriedo-Silane[7] | | 0.75 | 0.75 | 0.75 | 0.75 | 0.75 | 0.75 | 0.75 | 0.75 | | | | 0.75 | 0.75 | | |
| Witco Y-11683[8] | | 0.3 | 0.3 | 0.3 | | | | 0.3 | 0.3 | 0.3 | 0.3 | 0.55 | 0.3 | 0.3 | 0.3 | 0.3 |
| 3-Aminopropyl Trimethoxysilane | 0.3 | | | | 0.3 | | 0.1 | | | | | | | | | |
| Alkyl Tin Carboxylate | | | | | | .06 | | | 0.1 | | | | | | | |
| Aminomethyl-3-aminopropyl-methyl-dimethylsilane | | | | | | | | | | 1.0 | 1.0 | 0.75 | | 1.0 | 1.0 | 1.0 |

[1] 2000 cps hydroxy-terminated polydimethylsiloxane
[2] 6000 cps hydroxy-terminated polydimethylsiloxane
[3] 10,000 cps hydroxy-terminated polydimethylsiloxane
[4] Aluminum pigment powder in mineral oil
[5] Tetra(methyl ethyl ketoximino)silane/vinyl tris(methyl ethyl ketoximino)silane 11
[6] Vinyl tris(methyl ethyl ketoximino)silane
[7] Gamma-ureidopropyltrimethoxy silane
[8] Hexafunctional silyl ethane Physical properties of the above compositions were measured and lap shear specimens were prepared for these compositions according to the procedure set forth previously. The compositions were extruded at the rate indicated. The results of these measurements are set forth Table 7.

TABLE 7

Physical Properties and Lap Shear Measurements for Compositions 15–30.

| Composition | Extrusion Rate (g/min) | Hardness Shore A | Tensile Strength (psi) | 100% Modulus (psi) | % Elongation | Al shear strength (psi) | Mg shear strength (psi) |
|---|---|---|---|---|---|---|---|
| 15 | 200 | 58 | 295 | 221 | 196 | 202 | 94 |
| 16 | 150 | 59 | 504 | 342 | 182 | — | 137 |
| 17 | 340 | 50 | 371 | 202 | 226 | 175 | 77 |
| 18 | 131 | 56 | 427 | 263 | 252 | 232 | 126 |
| 19 | 300 | 42 | 335 | 150 | 228 | 148 | 74 |
| 20 | 50 | 48 | 570 | 180 | 358 | 144 | 54 |
| 21 | 44 | — | — | — | — | — | 55 |
| 22 | 147 | — | — | — | — | — | 80 |
| 23 | 60 | 53 | 323 | 167 | 293 | — | 117 |
| 24 | 330 | 53 | 341 | 241 | 166 | — | — |
| 25 | 330 | 48 | 376 | 228 | 217 | — | 155 |
| 26 | 340 | 45 | 272 | 189 | 222 | — | 70 |
| 27 | 22 | 50 | 309 | 233 | 177 | — | 83 |
| 28 | 2 | 50 | 351 | 277 | 146 | — | 186 |
| 29 | 7 | 48 | 419 | 265 | 195 | — | 225 |
| 30 | 7 | 48 | 473 | 307 | 167 | — | 188[1] |

[1] 20% cohesive failure. Indicates excellent adhesion to magnesium alloy substrate.

While many of the inventive Compositions 15–30 demonstrate improved magnesium shear strength, Compositions 28–30 show particularly exceptional magnesium shear strength. Optimized Composition 30 was seen to demonstrate 20% cohesive failure at a magnesium shear strength of 188 psi, indicating that this composition exhibits excellent adherence to magnesium alloy substrates. Particular compositions were selected from the group of Compositions 15–30 and were immersed in selected automotive fluids for selected lengths of time and at selected temperatures, in a manner similar to that of Compositions 1–14. Physical properties and lap shear results were measured subsequent to immersion and the changes in these measurements from those taken pre-immersion were calculated. It was found that these compositions demonstrate exceptional resistance to automotive fluids. The results of these immersions are illustrated in Tables 8–13.

TABLE 8

Physical Properties and Lap Shear Measurements for Compositions 15–20 and 23–30 Subsequent to Immersion in Honda ® LC Coolant at 105° C. for 150 Hours.

| Composition | Hardness Shore A/ % Change | Tensile Strength (psi)/ % Change | % Elongation/ % Change | Mg Shear Strength (psi)/ % Change | Al Shear Strength (psi)/ % Change |
|---|---|---|---|---|---|
| 15 | 15/–43 | 182/–38 | 793/305 | — | 75/–63 |
| 16 | 0/–59 | — | — | — | — |
| 17 | 27/–23 | 111/–70 | 409/81 | — | — |
| 18 | 37/–19 | 62/–85 | 307/22 | — | — |
| 19 | 15/–27 | 170/–49 | 496/118 | 59/–20 | 102/–31 |
| 20 | 30/–18 | 335/–41 | 439/23 | 90/67 | 210/46 |
| 23 | 24/–29 | 196/–39 | 352/20 | — | — |
| 24 | 0/–53 | — | — | 44 | — |
| 25 | 12/–36 | 150/60 | 478/120 | 30/–81 | — |
| 26 | 26/–19 | 207/–24 | 332/50 | 122/74 | — |
| 27 | 29/–21 | 204/–34 | 312/76 | 124/49 | — |
| 28 | 23/–27 | 165/–53 | 354/142 | 41/–78 | — |
| 29 | 23/–25 | 245/–42 | 447/129 | 73/–68 | — |
| 30 | 26/–22 | 266/–44 | 318/90 | 108/–43[1] | — |

[1]20% cohesive failure. Indicates excellent adhesion to magnesium alloy substrate.

TABLE 9

Physical Properties and Lap Shear Measurements for Compositions 15–20 and 23–25 Subsequent to Immersion in an Aqueous Solution of 50% DexCool ® at 105° C. for 150 Hours.

| Composition | Hardness Shore A/ % Change | Tensile Strength (psi)/ % Change | % Elongation/ % Change | Mg Shear Strength (psi)/ % Change | Al Shear Strength (psi)/ % Change |
|---|---|---|---|---|---|
| 15 | 15/–43 | 182/–38 | 793/305 | — | — |
| 16 | | — | — | 12/–91 | — |
| 17 | 0/–50 | — | — | 22/–71 | 42/–76 |
| 18 | 0/–56 | — | — | 29/–77 | 59/–75 |
| 19 | 19/–23 | 131/–61 | 546/139 | 69/–7 | 71/–52 |
| 20 | 28/–20 | 288/–49 | 393/10 | 84/56 | 166/15 |
| 23 | 0/–53 | — | — | — | — |
| 24 | 0/–53 | — | — | 95/– | — |
| 25 | 0/–48 | — | — | 91/–41 | — |

TABLE 10

Physical Properties and Lap Shear Measurements for Compositions 19–20 and 23–30 Subsequent to Immersion in Honda ® Gear Oil at 120° C. for 150 Hours.

| Composition | Hardness Shore A/ % Change | Tensile Strength (psi)/ % Change | % Elongation/ % Change | Mg Shear Strength (psi)/ % Change | Al Shear Strength (psi)/ % Change |
|---|---|---|---|---|---|
| 19 | 22/–20 | 303/–10 | 267/17 | 102/38 | 205/39 |
| 20 | 25/–23 | 443/–22 | 378/6 | 55/2 | 269/87 |
| 23 | 23/–30 | 348/8 | 258/–12 | — | — |
| 24 | 0/–53 | — | — | 95/– | — |
| 25 | 27/–21 | 400/6 | 235/8 | 91/–41 | — |
| 26 | 32/–13 | 329/21 | 201/–9 | 14/–80 | — |
| 27 | 34/–16 | 357/16 | 151/–15 | 11/–87 | — |
| 28 | 30/–20 | 386/10 | 196/34 | 83/–55 | — |
| 29 | 26/–22 | 397/–5 | 251/29 | 62/–72 | — |
| 30 | 28/–20 | 395/–16 | 178/7 | 117/–38[1] | — |

[1]75% cohesive failure. Indicates excellent adhesion to magnesium alloy substrate.

As seen in Tables 7, 8, and 10, Composition 30 shows excellent adhesion to magnesium alloy substrates. Composition 30 demonstrates 20% cohesive failure at a magnesium shear strength of 188 psi prior to immersion in automotive fluids, 20% cohesive failure at a magnesium sheer strength of 108 psi subsequent to immersion in Honda(& coolant, and 75% cohesive failure at a magnesium shear strength of 117 psi subsequent to immersion in Honda® gear oil. As noted previously, this failure within the adhesive as opposed to failure at the bondline interface indicates that the adhesion to the magnesium substrate is stronger than the adhesive per se. Such failure is desirable in the present invention as it indicates enhanced adherence to the magnesium substrate.

TABLE 11

Physical Properties and Lap Shear Measurements for Compositions 16–20 and 24–25 Subsequent to Immersion in Texaco ® 2224 Gear Oil at 105° C. for 150 Hours.

| Composition | Hardness Shore A/ % Change | Tensile Strength (psi)/ % Change | % Elongation/ % Change | Mg Shear Strength (psi)/ % Change | Al Shear Strength (psi)/ % Change |
|---|---|---|---|---|---|
| 16 | 33/–26 | 326/–35 | 243/34 | 264/93 | — |
| 17 | 0/–50 | — | — | — | — |
| 18 | 0/–56 | — | — | — | — |
| 19 | 10/–32 | 52/–84 | 669/193 | 131/77 | 124/–16 |
| 20 | 0/–48 | — | — | 38/–89 | 120/–17 |
| 24 | 0/–53 | — | — | — | — |
| 25 | 0/–48 | — | — | — | — |

Selected Compositions 15–30 were subjected to addition immersion tests and their physical properties were measured. The changes in physical properties from those measured pre-immersion were also calculated. These results are presented in Tables 12–15.

TABLE 12

Physical Properties for Compositions 14–19 After Aging For 3 Days at 82° C. and 3Bond ® Subsequent to Immersion in 5W-30 ® at 120° C. for 150 Hours.

| Composition | Hardness Shore A/ % Change | Tensile Strength (psi)/ % Change | 100% Modulus (psi)/ % Change | % Elongation (in.)/ % Change |
|---|---|---|---|---|
| 15 | 34/−41 | 396/34 | 183/−17 | 263/34 |
| 16 | 42/−29 | 537/7 | 305/−11 | 166/−9 |
| 17 | 30/−40 | 334/−10 | 162/−20 | 194/−14 |
| 18 | 35/−38 | 430/1 | 203/−23 | 228/−10 |
| 19 | — | — | — | — |
| 20 | — | — | — | — |
| 3Bond ® | 39/−32 | 490/22 | 259/−2 | 203/−11 |

TABLE 13

Physical Properties for Compositions 16, 19–20 After Aging For 3 Days at 82° C. and 3Bond ® Subsequent to Immersion in Texaco ® 2224 Gear Oil at 120° C. for 150 Hours.

| Composition | Hardness Shore A/ % Change | Tensile Strength (psi)/ % Change | 100% Modulus (psi)/ % Change | % Elongation (in.)/ % Change |
|---|---|---|---|---|
| 16 | 33/−44 | 326/−35 | 133/−61 | 243/34 |
| 19 | 10/−76 | 52/−84 | — | 669/193 |
| 20 | 0/−100 | 0/−100 | 0/−100 | 0/−100 |
| 3Bond ® | 0/−100 | 0/−100 | 0/−100 | 0/−100 |

TABLE 14

Physical Properties for Composition 15 After Aging For 3 Days at 82° C. Subsequent to Immersion in Dexron III ATF ® at 120° C. for 150 Hours.

| Composition | Hardness Shore A/ % Change | Tensile Strength (psi)/ % Change | 100% Modulus (psi)/ % Change | % Elongation (in.)/ % Change |
|---|---|---|---|---|
| 15 | 25/−57 | 347/914 | 127/−839 | 286/737 |

TABLE 15

Physical properties for Compositions 15–20 After Aging For 3 Days at 82° C. and 3Bond ® Subsequent to Immersion in an Aqueous Solution of 50% DexCool ® at 105° C. for 150 Hours.

| Composition | Hardness Shore A/ % Change | Tensile Strength (psi)/ % Change | 100% Modulus (psi)/ % Change | % Elongation (in.)/ % Change |
|---|---|---|---|---|
| 15 | 15/−74 | 182/−38 | 37/−83 | 793/305 |
| 16 | 0/−100 | 0/−100 | 0/−100 | 0/−100 |
| 17 | 27/−46 | 111/−70 | 45/−78 | 409/81 |
| 18 | 37/−34 | 62/−85 | 39/−85 | 307/22 |
| 19 | 19/−55 | 131/−61 | 35/−78 | 546/139 |
| 20 | 28/−42 | 288/−49 | 77/−57 | 393/10 |
| 3Bond ® | 46/−19 | 221/−45 | 147/−44 | 214/−6 |

As the above tables 8–15 illustrate, the inventive compositions generally show a loss of some tensile strength subsequent to immersion in automotive fluids for selected lengths of time and at selected temperatures chosen to simulate accelerated aging. However, these tables show that the inventive compositions generally maintain sufficient bond strength following immersion. This indicates that these compositions would be suitable sealing and bonding agents for magnesium-based substrates used in automotive applications.

Lap shear tests were conducted prior to, and subsequent to, immersion in automotive fluid solids for selected compositions using aluminum, steel and magnesium substrates, as shown in Tables 16–27. As illustrated in these tables, the compositions of the present invention demonstrate excellent adherence to all three of these substrates while maintaining excellent resistance to automotive fluid solvents.

TABLE 16

Lap Shear Measurements for Compositions 15, 17–20 Using Aluminum Specimens.

| Composition | Shear Adhesion (psi) | Joint Movement (in.) | Cohesive Failure (%) |
|---|---|---|---|
| 15 | 202 | 0.11 | 100 |
| 17 | 175 | 0.9 | 85 |
| 18 | 232 | 0.104 | 90 |
| 19 | 148 | 0.093 | 90 |
| 20 | 144 | 0.118 | 10 |

TABLE 17

Lap Shear Measurements for Compositions 15, 17–18 aged for 3 days at 82° C. Using Aluminum Specimens Subsequent to Immersion in 5W-30 ® at 120° C. for 150 Hours.

| Composition | Shear Adhesion (psi)/ % Change | Joint Movement (in.)/ % Change | Cohesive Failure (%) % Change |
|---|---|---|---|
| 15 | 300/49 | 0.137/25 | 100/0 |
| 17 | 237/35 | 0.129/−86 | 100/18 |
| 18 | 305/31 | 0.141/36 | 100/11 |

TABLE 18

Lap Shear Measurements for Composition 15 aged for 3 days at 82° C. Using Aluminum Specimens Subsequent to Immersion in ATF ® at 120° C. for 150 Hours.

| Composition | Shear Adhesion (psi)/ % Change | Joint Movement (in.)/ % Change | Cohesive Failure (%) % Change |
|---|---|---|---|
| 15 | 255/26 | 0.141/28 | 90/−10 |

TABLE 19

Lap Shear Measurements for Compositions 15, 17–18 aged for 3 days at 82° C. Using Aluminum Specimens Subsequent to Immersion in an Aqueous Solution of 50% DexCool ® at 120° C. for 150 Hours.

| Composition | Shear Adhesion (psi)/ % Change | Joint Movement (in.)/ % Change | Cohesive Failure (%)/ % Change |
|---|---|---|---|
| 15 | 75/−63 | 0.196/78 | 5/−95 |
| 17 | 42/−76 | 0.114/−87 | 25/−71 |
| 18 | 59/−75 | 0.142/37 | 10/−89 |

TABLE 20

Lap Shear Measurements for Compositions 15, 17–18 aged for 3 days at 82° C. Using Steel Specimens.

| Composition | Shear Adhesion (psi) | Joint Movement (in.) | Cohesive Failure (%) |
|---|---|---|---|
| 15 | 207 | 0.112 | 90 |
| 17 | 123 | 0.061 | 0 |
| 18 | 189 | 0.084 | 30 |

TABLE 21

Lap Shear Measurements for Compositions 15, 17–18 Aged for 3 Days at 82° C. Using Steel Specimens After Immersion in 5W-30 ® at 120° C. for 150 Hours.

| Composition | Shear Adhesion (psi)/ % Change | Joint Movement (in.)/ % Change | Cohesive Failure (%)/ % Change |
|---|---|---|---|
| 15 | 91/−56 | 0.054/−52 | 0/−100 |
| 17 | 49/−60 | 0.041/−33 | 0/0 |
| 18 | 112/−41 | 0.068/−19 | 0/−100 |

TABLE 22

Lap Shear Measurements for Composition 15 Aged for 3 days at 82° C. Using Steel Specimens Subsequent to Immersion in ATF ® at 120° C. for 150 Hours.

| Composition | Shear Adhesion (psi)/ % Change | Joint Movement (in.)/ % Change | Cohesive Failure (%)/ % Change |
|---|---|---|---|
| 15 | 92/−56 | 0.062/−45 | 0/−100 |

TABLE 23

Lap Shear Measurements for Compositions 15, 17–18 Aged for 3 days at 82° C. Using Steel Specimens Subsequent to Immersion in an Aqueous Solution of 50% DexCool ® at 120° C. for 150 Hours.

| Composition | Shear Adhesion (psi)/ % Change | Joint Movement (in.)/ % Change | Cohesive Failure (%)/ % Change |
|---|---|---|---|
| 15 | 73/−65 | 0.208/86 | 5/−94 |
| 17 | 35/−72 | 0.112/84 | 0/0 |
| 18 | 36/−81 | 0.1/19 | 5/−83 |

TABLE 24

Lap Shear Measurements for Compositions 15–20 Aged for 3 days at 82° C. and 3Bond ® Using Cast Magnesium Alloy Specimens.

| Composition | Shear Adhesion (psi) | Joint Movement (in.) | Cohesive Failure (%) |
|---|---|---|---|
| 15 | 94 | 0.032 | 0 |
| 16 | 137 | 0.069 | 50 |
| 17 | 77 | 0.034 | 0 |
| 18 | 126 | 0.053 | 0 |
| 19 | 74 | 0.049 | 0 |
| 20 | 54 | 0.029 | 0 |
| 3Bond ® | 91 | 0.033 | 0 |

TABLE 25

Lap Shear Measurements for Compositions 15–16 Aged for 3 days at 82° C. and 3Bond Using Cast Magnesium Alloy Specimens Immersed in 5W-30 ® 120° C. for 150 Hours.

| Composition | Shear Adhesion (psi)/ % Change | Joint Movement (in.)/ % Change | Cohesive Failure (%)/ % Change |
|---|---|---|---|
| 15 | 75/−20 | 0.045/41 | 0/0 |
| 16 | 292/113 | 0.110/59 | 95/90 |
| 3Bond ® | 151/66 | 0.100/203 | 5/− |

TABLE 26

Lap Shear Measurements for Compositions 16–18 Aged for 3 days at 82° C. and 3Bond Using Cast Magnesium Alloy Specimens Immersed in an Aqueous Solution of 50% DexCool ® at 105° C. for 150 Hours.

| Composition | Shear Adhesion (psi)/ % Change | Joint Movement (in.)/ % Change | Cohesive Failure (%)/ % Change |
|---|---|---|---|
| 16 | 12/−91 | 0.045/−35 | 0/−100 |
| 17 | 22/−71 | 0.076/124 | 0/0 |
| 18 | 29/−77 | 0.106/100 | 0/0 |
| 3Bond ® | 63/−31 | 0.058/76 | 5/− |

TABLE 27

Lap Shear Measurements for Composition 16 Aged for 3 days at 82° C. and 3Bond Using Cast Magnesium Alloy Specimens Immersed in Texaco ® 2224 at 120° C. for 150 Hours.

| Composition | Shear Adhesion (psi)/ % Change | Joint Movement (in.)/ % Change | Cohesive Failure (%)/ % Change |
|---|---|---|---|
| 16 | 264/93 | 0.113/64 | 5/−90 |
| 3Bond ® | 28/−69 | 0.085/158 | 5/− |

What is claimed is:

1. A method for providing enhanced adhesion to magnesium-based substrates comprising the stops of:
   a) providing a composition comprising:
      (i) at least one polymerizable silicone component;
      (ii) at least one amino-containing silane adhesion promoter; and
      (iii) at least one filler;
   b) disposing said composition between two substrates, at least one of which is magnesium-based; and
   c) curing said composition to effectuate enhanced adhesion thereof.

2. The method of claim 1, wherein said amino-containing silane adhesion promoter is selected from the group consisting of gamma-urcidopropyltrimethoxy silane, 3-aminopropyl trimethoxysilane, N,N'-bis(3-trimethoxy silylpropyl)urea, gamma-aminopropyltrimethoxysilane, N-(2-aminoethyl)-3-aminopropyltriethoxysilane, N-(2-aminoethyl)-3-aminopropyltrimethoxysilane, trimethoxysilylpropyldiethylene triamine, methyl tris-(N-methylbenzamido)silane, methyl tris(cyclohexylamino) silane, aminoethyl-3-aminopropyl-methyl-dimethylsilane, tertiary alkyl carbamate silane, and combinations thereof.

3. The method of claim 1, wherein said amino-containing silane adhesion promoter is present in amounts of about 0.1 percent by weight of said composition to about 5.0 percent by weight of said composition.

4. The method of claim 1, wherein said polymerizable silicone compound is a room temperature vulcanizable silicone.

5. The method of claim 4, wherein said room temperature vulcanizable silicone is a hydroxy-terminated polydimethylsiloxane.

6. The method of claim 5, wherein said hydroxy-terminated polydimethylsiloxane is present in amounts of about 45.2 percent by weight of said composition to about 55.2 percent by weight of said composition.

7. The method of claim 1, wherein said polymerizable silicone compound is a heat curable silicone.

8. The method of claim 1, wherein said polymerizable silicone compound is an actinic radiation curable silicone.

9. The method of claim 1, wherein said filler is selected from the group consisting of carbon black, aluminum flake, silane-treated fumed silica, precipitated silica, calcium carbonate, stearate coated calcium carbonate, iron aluminum silicate, magnesium oxide, talc, ground quartz, clay, titanium dioxide, iron oxide, cerium oxide, zinc oxide, barium oxide, and combinations thereof.

10. The method of claim 1, wherein said filler is present in amounts of about 37.55 percent by weight of said composition to about 38.55 percent by weight of said composition.

11. The method of claim 1, further comprising a silane cross linking agent comprising tetra(methyl ethyl ketoximino) silane or vinyl tris(methyl ethyl ketoximino) silane.

* * * * *